Jan. 7, 1936. H. MALM Re. 19,809

FOOTWEAR

Original Filed June 28, 1933

INVENTOR.

Henry Malm

Reissued Jan. 7, 1936

Re. 19,809

UNITED STATES PATENT OFFICE 19,809

FOOTWEAR

Henry Malm, New York, N. Y.

Original No. 1,988,128, dated January 15, 1935, Serial No. 677,963, June 28, 1933. Application for reissue March 16, 1935, Serial No. 11,512

6 Claims. (Cl. 36—7.4)

My invention relates to improvements in waterproof overshoes for ladies' footwear and especially in that kind of overshoes which are destined to protect only the front part of ladies' shoes, as the heel part on account of the high heel shank usually worn, is elevated sufficiently above the pavement to protect it against immersion. This sort of overshoes, usually made of rubber like other common rubber shoes, are therefore called half-rubbers or toe-rubbers and will be designated by this name throughout the following specification.

Although this special kind of rubber shoes is in itself well known, and appears in different qualities and fashions, the kind presently in use, has to my knowledge two main drawbacks, first that at the point where the sole of the toe-rubber joins the instep of the shoe, there is usually insufficient protection against the seeping in of moisture and secondly, as these toe-rubbers are usually held in place, sandal-fashion, by ribbons which either stretch backwardly over the heel portion, the so-called quarter piece of the shoe, or are tied over the ridge of the foot, and such ribbons are provided with buttons or clasps or kindred fastening means, that these fastening means first become loose if they do not fit too loosely from the start already—and ultimately get lost altogether, mostly at a very inopportune occasion.

The first mentioned kind of ribbons which fit around the heel portion, have a tendency to slip upwardly and incommode the tendon of the ankle, just above the rim of the shoe, and both kinds mentioned, if they do not fit closely and resiliently, leave a loose gap where the toe rubber ends below the shoe sole which gives access to moisture seeping in.

The first object of my invention therefore, is to provide a toe-rubber which gives the best possible protection against the entrance of moisture at the edge where it fits the shoe-leather and especially the instep of the sole.

Another object is to provide fastening means which do not require any separate auxiliaries, like buttons, buckles or clasps.

A further object is to provide fastening means which tie the toe-rubber resiliently and automatically to the shoe and can be removed without unfastening any closing mechanism. A further object, subservient to the last one, is to provide fastening means, forming an integral part of the toe-rubber.

A further object is to provide a buttonless and claspless toe-rubber, self-contained and consisting of one integral piece.

A final object, comprising all the aforesaid separate objects is to provide a buttonless toe rubber, forming a single mold, without any attachments, but adapted to form an automatic water-tight, and secure fit upon a lady's shoe.

These various objects are attained by the novel construction, combination of elements and arrangement of parts which will be exemplified in the toe-rubber herein described and illustrated in the accompanying drawing. The inventive idea involved is capable of a variety of modifications and fashions without departing from the principle of the inventive concept, and the one shown herewith ought to be considered as illustrative rather than as restrictive.

Figure 3:
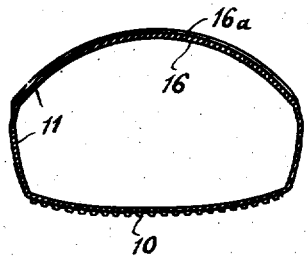
Fig. 3 is a sectional view along the line 3—3, in Fig. 1 through the rubber, the showing of the shoe and foot being omitted.

Considering the drawing more in detail, 10 designates the sole-part of the toe-rubber, made, as is customary, with a rather solid corrugated under surface and may, if desired, contain any reinforcing of fabric etc., or be made up of rubber layers of special quality in the molding process. This sole part is shown in Fig. 1 and in section in Fig. 3.

Figure 2:
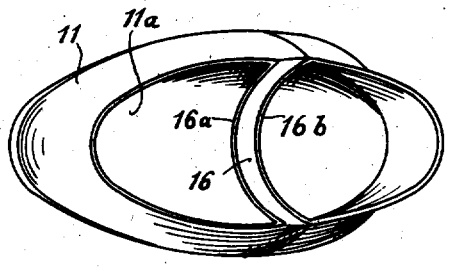
Fig. 2 is a top view of the toe-rubber, apart from the shoe.

Above the sole is provided the body part 11 of the rubber shoe, molded as an integral piece with the sole and so as to provide a tight fit to the size and fashion of shoe it is intended for. An important part is the instep apron or lip 12, forming an upwardly inclined socket in which the descending part of the instep sole rests with a tight fit. As will be observed from the drawing the apron comprises a shank portion extending upwardly and rearwardly from the sole and the adjoining rear portions of the sides. While the shank portion should extend sufficiently high to exclude the entrance of moisture, it will fit more tightly against the shoe if it be abbreviated in length so as to cover only the lower forward part of the shoe shank. The arch of the upper body part can be cut out, as shown by 11a in Fig. 2, and the upper rim of this cut out as well as the rear edge of the instep lip 12 is provided with beaded borders 13 and 14 respectively. 15 indicates the parting seam where the mold portions meet and are jointed during the molding operation.

Figure 1:
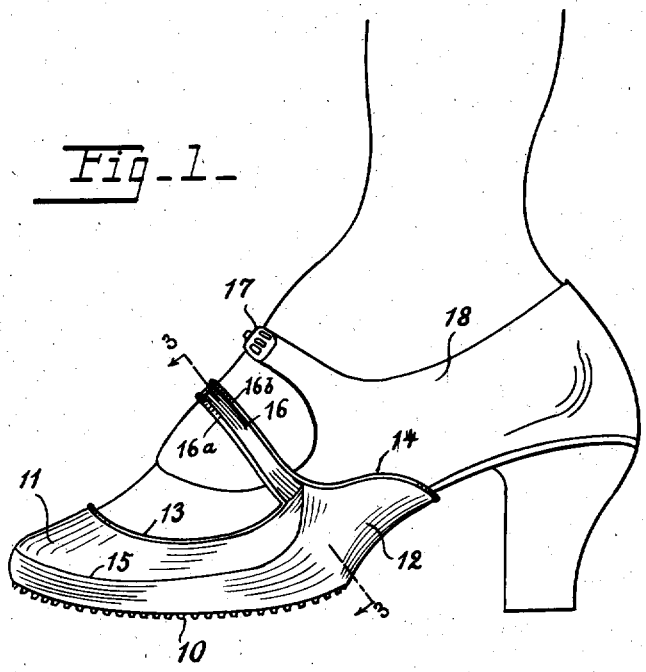
Fig. 1 is a side elevation, showing a toe-rubber made according to my invention, applied to a lady's shoe.

Forming an integral and inseparable part of the toe-rubber body, a rather substantial band of elastic rubber in the form of a strap 16, spans the cut out aperture of the rubber shoe and is positioned in such a way that, when stretched, it passes with suitable tension over the ridge of the foot as shown in Fig. 1 and engages the lower forward part of the instep arch forward of the ankle and the adjoining steeply sloping portion of the arch.

It is preferably arranged so as to pass beneath the shoe-buckle 17 of the shoe 18, as indicated in Fig. 1. However, in other cases, with buttoned or laced shoes or such with self-closing patent seams, this position is immaterial. This rubber band or ribbon is also preferably reinforced by two beaded borders 16a and 16b, similar to the borders 13 and 14. It is to be observed that this tie band, having no locking or opening means, depends entirely on its elasticity to be placed and to remain in position, and also on account of its origin of attachment, being opposite to the apron 12 tends to draw the latter into close contact with the instep of the shoe sole.

Since the overshoe is entirely open in the heel area and entirely devoid of rearwardly acting tensioning bands, the position of the elastic strap 16 is fixed in accordance with the contour of the foot so that the same may properly retain the apron 12, and particularly the shank portion thereof, in tight fitting engagement with the shoe. The strap should extend along a forwardly and upwardly inclined line so as to engage the forward part of the instep arch and meet the sides just rearwardly of the meeting of the shank with the sole. By such arrangement. the tension exerted by the strap will be in a direction substantially perpendicular to the shank. There will be no tendency for the strap to work down the instep arch and the tension exerted thereby will act on the shank so as to effectively retain the same in its proper position and hold the overshoe as an entirety against slipping off the shoe without the necessity of heel bands. The strap, corresponding portions of the sides and the shank together constitute a circumferentially continuous portion which encompasses the lower part of the instep arch and the shoe in the area of narrower cross-section immediately behind the ball of the foot.

Another advantage of this one-piece toe-rubber is that when the ribbon or band comes into direct contact with the thin (silk) stocking, as incidentally in Fig. 1, it exerts no irritating pressure upon the skin or causes damage to the fabric, as a butt joint or clasp might easily produce.

To attach the toe-rubbers the tip of the shoe is simply inserted into it and the ribbon strap is stretched and slipped over the lower instep ridge of the foot. They can be removed by simply stripping them off. This convenience in manipulating them is not to be overlooked, as in fact a person, who for instance carries a pair of these toe rubbers in her handbag would in an emergency, even if she only had one hand free to use, be able with one hand to attach these slip-over shoes to her feet, as there are no buttons or clasps to handle.

Toe-rubbers or half over-shoes, as hereinbefore stated, are known which have bands extending rearwardly of the toe-rubber and over the heel of the shoe, and also forwardly over the instep. Such a rearwardly extending band, however, either slips upwardly and irritates, if not actually harms, the foot of the wearer, as previously noted, or else, when elongated by use, sags downwardly over the heel,—in either case seriously impairing the usefulness of the toe-rubber. Furthermore such a band draws the rear edge of the shank part of the rubber away from the shank of the shoe and thus permits free access of water between the rubber and shoe. Where a single instep band is provided in the art, such band is either formed in two sections with means for fastening the sections together, or the band is integrally connected to one side of the toe-rubber and attached by some fastening device to the opposite side of the rubber upper. These fastening devices in many instances have members depending from the under side of the instep band which prevent a close fit between the instep band or side of the rubber and the shoe. In any event, the close contact between the shanks of the rubber and the shoe necessary to prevent entrance of water between the rear edge of the rubber and the shoe cannot be secured, and this condition also obtains in the other constructions of the art hereinbefore described.

In accordance with my invention, however, and as shown in the drawing, the instep band 16, which extends between the opposite rear side parts of the toe-rubber, is elastic and is made of suitable length and formed in one piece which is merged at its opposite ends in the respective adjacent rear side parts of the upper. It may be noted here that the elastic instep band 16 may be made of such length that it will afford a tight fit when in its proper position, even if somewhat elongated by wear. Moreover, in its preferred form, the toe-rubber is composed of a homogeneous, highly elastic unitary or one-piece molded rubber body, where the mold sections meet and are jointed being indicated by the seam 15; the entire half over-shoe presents a smooth interior surface, and the elastic instep band 16 is molded as a part of the upper of the rubber, its opposite ends being vulcanized to the respective adjacent rear ends of the opposite sides of said upper.

It will be apparent that with such a construction the necessity for providing any manner of extraneous fastening means, as buttons, clasps, and the like, is entirely obviated and, as heretofore stated, and of great importance, the toe-rubber or half over-shoe can be easily and quickly slipped into place over the shoe by merely stretching it. Furthermore, when the one-piece elastic band 16 is in place, it will draw the shank part 12 and the adjacent side parts of the upper of the half over-shoe into close fitting and water-tight engagement not only with the shank of the shoe but with the adjacent narrower parts of the shoe upper beyond the sole, and will thus also serve to keep the entire half over-shoe in proper place upon the shoe of the wearer. A further advantage of this construction resides in the fact that, where the one-piece elastic instep band 16 merges into the side parts of the upper of the rubber, a perfectly smooth connection results, no ridges being formed, but on the contrary the same thickness of material existing at the juncture as there is in the band itself or in the body of the half over-shoe. The edge of the rubber thus makes a smooth, unbroken contact with the shoe throughout its entire extent.

It will be noted that a half over-shoe constructed as herein described, being composed wholly of elastic rubber, may be made of a size to fit any size of shoe. If desired, however, the half over-shoes may be made in two sizes, one for shoes of small sizes and one for shoes of larger sizes, thus avoiding undue stretching of a small-size half over-shoe to fit a large-size shoe.

The invention in its broader aspects is not limited to the precise construction shown and described, as changes may be made in the details thereof without departing from the spirit of the invention or sacrificing its chief advantages. For example, while over-shoes constructed in accordance with the invention have been described and illustrated as adapted for ladies' shoes, it will be obvious that such over-shoes may be used to equal advantage on men's shoes. For men's shoes the embodiment of half over-shoes shown in the drawing is recommended, it being found that the rearwardly extending lip 14 is particularly useful, owing to the lesser or flatter slope of the shank of a man's low heel shoe as compared with a lady's high heel shoe.

Having described my invention according to the rules of patent practice, what I claim is:

1. An elastic over-shoe comprising a body portion consisting of a lower part for embracing the lower portion of a shoe, an upper part connected to said lower part for overlying the toe of the shoe, a sole part connected to said first mentioned part, a shank part extending upwardly from the rear of said sole part to cover the shank of the shoe and an elastic band connected to said body portion for extending over the instep of the foot, said shank part extending beyond the point of connection between the elastic band and the body portion in the form of a lip the rear edge of which is curved from said point of connection to the shank part of the lip to bring said edge into close engagement with the sides of the shoe adjacent said rear edge, when said elastic band is drawn into tight-fitting relationship with said shoe.

2. An elastic over-shoe comprising a body portion consisting of a lower part for embracing the lower portion of a shoe, an upper part connected to said lower part for overlying the toe of the shoe, a sole part connected to said first mentioned part, a shank part extending upwardly from the rear of said sole part to cover the shank of the shoe and an elastic band connected to said body portion for extending over the instep of the foot, said shank part extending beyond the point of connection between the elastic band and the body portion in the form of a lip, the rear edge of which is curved in the form of an inverted S from said point of connection to the shank part of the lip to bring said edge into close engagement with the sides of the shoe adjacent said rear edge, when said elastic band is drawn into tight-fitting relationship with said shoe.

3. An elastic over-shoe comprising a body portion for embracing the toe of a shoe, a shank part to cover the shank of the shoe and an elastic band connected to said body portion for extending over the instep of the foot, said shank part extending beyond the point of connection between the elastic band and the body portion in the form of a lip, the rear edge of which is curved from said point of connection to the shank part of the lip to bring said edge into close engagement with the sides of the shoe adjacent said rear edge, when said elastic band is drawn into tight-fitting relationship with said shoe.

4. A sandal-type half over-shoe including a sole, an upper adapted to cover the sides and toe of a shoe and open in the instep arch area above the sides, an abbreviated shank adapted to cover the lower part of the shoe shank extending rearwardly and upwardly from the sole and integral with the upper, and a single elastic retaining strap spanning the instep space opposite the shank and being integral at its opposite ends with the rear portions of the opposite sides of the upper just rearwardly of the meeting of the shank with the sole, said strap constituting with the corresponding parts of the sides and the shank a circumferentially continuous portion adapted in its upper part to extend only over the forward instep arch area and in its lower part fitting the lower shank area and adjoining side parts of the shoe well forward of the heel.

5. A sandal-type half over-shoe including a sole, an upper adapted to cover the sides and toe of a shoe and open above the sides in the instep arch area back of the toe, an abbreviated shank integral with the rear portions of the opposite sides of the upper and extending rearwardly and upwardly from the sole to cover the lower forward part of the shoe shank, and a one-piece elastic instep strap extending between and at its opposite ends integral with the respective sides of the upper opposite the lower forward part of the over-shoe shank and arranged to extend upwardly and forwardly to cross the lower forward part of the instep arch.

6. A sandal-type half over-shoe including a sole, an upper adapted to cover the sides and toe of a shoe and open in the instep arch area back of the toe, a shank integral with the rear portions of the opposite sides of the upper and extending upwardly and rearwardly from the sole to cover the lower part of the shoe shank, said over-shoe being of shorter length than the shoe and being entirely open in, and free of connection with, the heel area of the shoe rearwardly of the over-shoe shank to avoid any pull on the over-shoe shank in a rearward direction, and an elastic retaining strap engageable well forwardly of the ankle with the lower part of the instep arch spanning the space between the sides of the upper and being integral at its opposite ends with said sides well forwardly of the shoe heel area, said strap through the corresponding side portions of the upper exerting an effective retaining tension on the over-shoe shank just rearwardly of the meeting of said shank with the sole in a direction upwardly and forwardly towards the lower part of the instep arch, and said strap with said side portions and shank constituting a circumferentially continuous portion contractible about the shoe and lower instep arch in the area of narrower cross-section immediately behind the ball of the foot.

HENRY MALM.